United States Patent
Yamaguchi et al.

(10) Patent No.: US 6,915,836 B2
(45) Date of Patent: Jul. 12, 2005

(54) METHOD AND APPARATUS FOR MANUFACTURING DISK ROTOR

(75) Inventors: Tomohiro Yamaguchi, Toyota (JP); Tomiyuki Murayama, Toyota (JP); Keiji Hatsuyama, Toyota (JP)

(73) Assignee: Aisin Takaoka Co., Ltd. (JP)

( * ) Notice: Subject to any disclaimer, the term of this patent is extended or adjusted under 35 U.S.C. 154(b) by 0 days.

(21) Appl. No.: 10/216,312

(22) Filed: Aug. 9, 2002

(65) Prior Publication Data

US 2003/0038001 A1 Feb. 27, 2003

(30) Foreign Application Priority Data

Aug. 24, 2001 (JP) ........................................ 2001-254267
Feb. 14, 2002 (JP) ........................................ 2001-036590

(51) Int. Cl.[7] .............................................. B22D 17/24
(52) U.S. Cl. ....................... 164/332; 164/306; 164/320; 164/340
(58) Field of Search .................................. 164/306, 312, 164/319, 320, 332, 333, 334, 340, 339, 341, 113, 137, 112

(56) References Cited

U.S. PATENT DOCUMENTS

| | | | | |
|---|---|---|---|---|
| 4,298,049 A | * | 11/1981 | Counselor et al. ............. 164/30 |
| 5,113,583 A | * | 5/1992 | Jenkel et al. ............. 29/889.21 |
| 5,509,510 A | * | 4/1996 | Ihm ...................... 188/218 XL |
| 5,620,042 A | * | 4/1997 | Ihm ............................. 164/95 |
| 6,044,894 A | * | 4/2000 | Fujita et al. ................... 164/97 |
| 6,309,743 B1 | * | 10/2001 | Fujita ....................... 428/317.9 |
| 6,427,754 B1 | * | 8/2002 | Ozcan ........................... 164/95 |
| 6,571,858 B2 | * | 6/2003 | Fujita ........................... 164/98 |

FOREIGN PATENT DOCUMENTS

| JP | 61199380 | 8/1986 |
|---|---|---|
| JP | 63101299 | 4/1988 |

* cited by examiner

*Primary Examiner*—Jonathan J Johnson
*Assistant Examiner*—Len Tran
(74) *Attorney, Agent, or Firm*—Welsh & Katz, Ltd.

(57) ABSTRACT

A disk rotor is produced using pre-forms. A manufacturing device 10 includes lower mold 11 and upper mold 12. The lower mold 11 includes support block 13, main body part of the lower mold 14, inclined pins 15, core elements 16 and slider 17. In securing and supporting pre-forms 4A, 5A, a cylinder 18 is actuated to cause upward movement of the support block 13 and the main body part of the lower mold 14, during which movement, core elements 16 and slider 17 are slid relatively outwards along inclined pins 15. In this state, the pre-forms 4A, 5A are guided to preset sites. The support block 13 and the main body part of the lower mold 14 are then moved downwards, during which movement, core elements 16 and slider 17 are slid relatively inwards along the inclined pins 15. In this state, the pre-forms 4A, 5A are supported and secured stably to define a cavity.

4 Claims, 5 Drawing Sheets

METHOD AND APPARATUS FOR MANUFACTURING DISK ROTOR

BACKGROUND OF THE INVENTION

FIELD OF THE INVENTION

This invention relates to methods and apparatus for producing a disk rotor used e.g., for a vehicle braking device.

The disk rotor, used for a disk brake, is conventionally manufactured by casting (gravity casting). Since there is a demand nowadays for a lightweight vehicle, attempts are being made to use aluminum in preference to cast iron so far used, such that researches and developments are going on briskly.

Meanwhile, if the disk rotor is manufactured from aluminum by itself, there is raised such problem as low mechanical strength or susceptibility to wear. For overcoming this inconvenience, such technique has been developed which makes use of a ring-shaped pre-form obtained on solidifying e.g., alumina particles under pressurization or sintering. In manufacturing a disk rotor employing such pre-form, molten metal (molten aluminum) is forcively charged into a cavity defined by metal molds (or dies), as the pre-form is supported at a preset location in a metal mold. Since the molten metal is impregnated into micro-sized pores of the pre-form, a molded product, in which the pre-form and aluminum are unified together, is obtained on solidification of the molten metal. The portion of the disk rotor, as an ultimate product, corresponding to a sliding surface with respect to a pad, is an exposed portion of the pre-form. That is, wear resistance is improved by the pre-form, which moreover plays the role of a reinforcement to increase the mechanical strength of the disk rotor in its entirety.

In manufacturing such disk rotor, it is necessary to support and secure the pre-form at a preset site of the metal mold and to maintain the supporting state even during the time of charging the molten metal. Among the techniques of maintaining the supporting state in this manner, there are a technique disclosed in JP Patent Kokai JP-A-1-272725 (first technique) and a technique disclosed in JP Patent Kokai JP-A-63-56347 (second technique). The first technique sets a molded fiber product (pre-form) by compacting and fitting it against a metal mold to prevent misregistration. The second technique applies a coating agent on the surface of a sand core and mounts a shaped fiber product (pre-form) on the sand core when the coating agent applied is as yet in a semi-dried state.

When the first technique is applied to the manufacture of the disk rotor, the pre-form is fitted and secured to the metal mold in a compressed state, so that there is raised a risk that the pre-form cannot withstand the compression stress and thus is fractured. When the second technique is applied, a separate working step is required, thus lowering the working efficiency.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
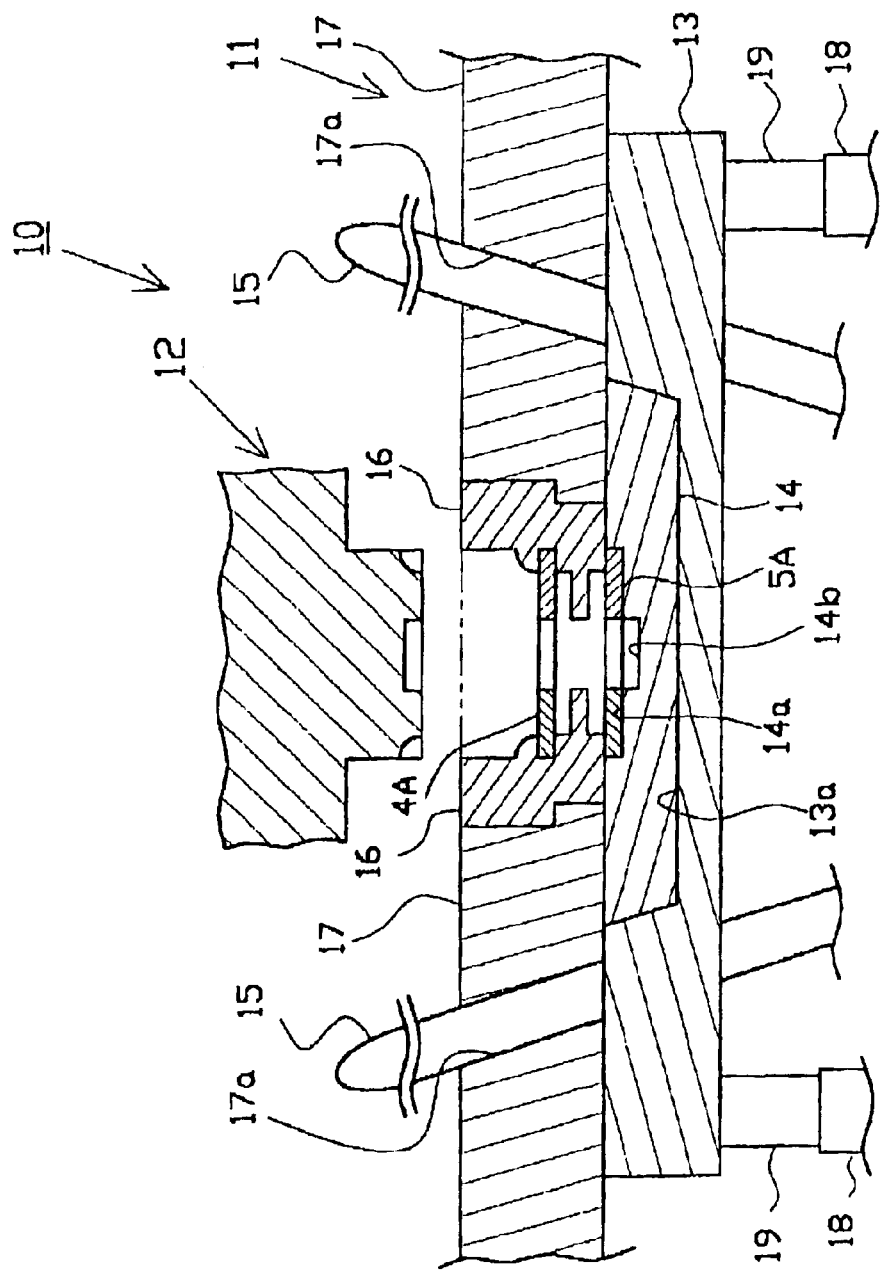
FIG. 1 is a cross-sectional view showing a device for manufacturing a disk rotor according to the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

In view of the above depicted status of the art, it is an object of the present invention to provide methods and apparatus for manufacturing a disk rotor in which, in manufacturing a disk rotor employing a pre-form, the pre-form supporting state may be stabilized, and in which it is possible to prevent the working efficiency from being lowered and to suppress increase in production costs.

For accomplishing the above object, according to a First Aspect of the present invention, there is provided an apparatus for manufacturing a disk rotor by charging and pressurizing molten metal in a cavity defined by first and second metal molds, mounted for movement into and out of contact with each other, during at least one pre-form is supported and secured in the cavity, wherein at least one of the first and second metal molds includes supporting means comprising a supporting part for supporting a marginal (or peripheral) portion of the pre-form and wherein the supporting means may assume a first state in which the pre-form may be guided to a preset site and a second state in which the cavity can be formed. The supporting part supports the marginal portion of the pre-form by the supporting means assuming a second state.

According to the First Aspect, as defined above, a disk rotor is manufactured by charging and pressurizing molten metal in a cavity defined by first and second metal molds mounted for movement into and out of contact with each other, during a pre-form is supported and secured in the cavity. In particular, according to the present invention, at least one of the first and second metal molds includes supporting means for supporting the marginal portion of the pre-form. That is, the pre-form can be guided to a preset site by the supporting means assuming the first state. A cavity can also be defined by the supporting means assuming the second state. Moreover, by the supporting means assuming the second state, the marginal portion of the pre-form can be supported by the support portion. Thus, in distinction from the conventional technique in which the pre-form has to be compressed or coated, the pre-form can be supported and secured at a preset location in a stable state without necessity of machining the pre-form in some way or other.

According to a Second Aspect of the present invention, there is provided an apparatus for manufacturing a disk rotor by charging and pressurizing molten metal in a cavity defined by first and second metal molds mounted for movement into and out of contact with each other, during at least one pre-form is supported and secured in the cavity, wherein at least one of the first and second metal molds comprises a main body part of the mold, movable between at least a first position and a second position, and supporting means that can be slid in a direction of intersecting the direction of movement of the main body part of the mold, and wherein the pre-form can be guided to a preset site when the main body part of the mold is in the first position. The supporting means forms a portion of the cavity and supports a marginal portion of the pre-form when the main body part of the mold is at the second position.

According to the Second Aspect, a main body part of at least one of the first and second metal molds may be slid between at least the first and second positions. During this movement, the supporting means can be slid in a direction intersecting the movement direction. When the main body part of the metal mold is in the first position, the pre-form can be guided to the preset site. On the other hand, when the main body part of the metal mold is in the second position, part of the cavity is formed by the supporting means, while the marginal portion of the pre-form is supported. Thus, by moving the main body part of the metal mold in this manner, the pre-form can be supported and secured, or released from its supported state. Thus, in distinction from the conventional technique in which the pre-form has to be compressed or coated, the pre-form can be supported and secured at a preset location in stability without necessity of machining the pre-form in some way or other.

According to a Third Aspect of the present invention, there is provided an apparatus for manufacturing a disk rotor including a first metal mold and a second metal mold mounted for movement into and out of contact with the first metal mold, in which molten metal is charged and pressurized in a cavity defined by the first and second metal molds during at least one pre-form is supported and secured in the cavity to produce the disk rotor, wherein the first metal mold comprises a main body part of the mold, movable between at least a first position and a second position, a plurality of inclined guides supported and secured for extending in a direction of intersecting the direction of movement of the main body part of the mold, at an angle of inclination, and a plurality of supporting means including insertion through-holes extending along the inclined guides. The inclined guides are introduced into the insertion through-holes. The supporting means assumes a first state to guide the pre-form to a preset site when the main body part of the mold is at the first position. The supporting means forms a portion of the cavity and assumes a second state of supporting a marginal portion of the pre-form when the main body part of the mold is at the second position.

According to the Third Aspect, the main body part of the mold, provided on the first metal mold, is movable between at least a first position and a second position into and out of contact of two metal molds. The first mold includes plural supporting means having plural insertion through-holes along plural inclined guides supported and secured for extending in a direction of intersecting the direction of movement of the main body part of the mold. The inclined guides are inserted through these insertion through-holes. When the main body part of the mold is at a first position, the supporting means are moved along the inclined guides to assume the first state. This enables the pre-form to be guided to a preset location. When the main body part of the mold is at a second position, the supporting means is moved along the inclined guides to assume the second state. This forms a part of the cavity to enable the molten metal to be charged as well as to enable the marginal portion of the pre-form to be supported. Thus, in distinction from the conventional technique in which the pre-form has to be compressed or coated, the pre-form can be supported and secured at a preset location in stability without the necessity of machining the pre-form in some way or other.

According to a Fourth Aspect of the present invention, there is provided an apparatus for manufacturing a disk rotor as defined in any of the First to Third Aspects, wherein the support means is capable of supporting the marginal portions of two pre-forms which are in a state of being separated from each other.

According to the Fourth Aspect, the marginal portions of two pre-forms, separated from each other, are supported by the supporting means, to add to the operation achieved by the above respective aspects. This renders it possible to produce a disk rotor having the pre-forms exposed on both outer and inner sides.

According to a Fifth Aspect of the present invention, there is provided a method for manufacturing a disk rotor including a pre-form supporting step of supporting and securing a pre-form at a preset site of a first metal mold as a second metal mold is separated from the first metal mold, and a molding step of charging and pressuring molten metal in a cavity defined between the first and second molds, during the second metal mold is contacted with the first metal mold, by way of mold clamping, wherein the first metal mold includes a movable main body part of the metal mold, and a supporting member capable of assuming a second state in contact with the main body part of the metal mold and a first state slid towards an outer periphery with respect to the second state, and wherein, in the pre-form supporting step, the main body part of the metal mold is located at a preset position to set the first state of the supporting member to guide the pre-form to a preset position. The main body part of the metal mold then is located at another preset position to set the supporting member in a second state. A marginal portion (or edge) of the disk rotor is supported and secured in the second state by the supporting member.

According to the Fifth Aspect, the pre-form is supported and secured in the pre-form supporting step, at a preset location of the first metal mold, as the second metal mold is separated from the first metal mold. In the molding step, molten metal is charged and pressurized in the cavity defined by the first metal mold and the second metal mold during the second metal mold is contacted with and clamped to the first metal mold. Meanwhile, the first metal mold in the present invention includes a main body part of the metal mold and supporting member. In the pre-form supporting step, the supporting member is in the first state, in which it is slid towards the outer periphery, by setting the main body part of the metal mold at a preset position. This enables the pre-form to be guided to the pre-set location. The main body part of the metal mold is subsequently set at a different preset position whereby the supporting member is in its second state. This forms a cavity along with the main body part of the metal mold to enable subsequent molding operations. Additionally, in the second state, the disk rotor has its marginal portion supported and secured by the supporting member. Thus, in distinction from the conventional technique in which the pre-form has to be compressed or coated, the pre-form can be supported and secured at a preset location in stability without necessity of machining the pre-form in some way or other.

According to a Sixth Aspect of the present invention, there is provided an apparatus for manufacturing a disk rotor by charging and pressurizing molten metal in a cavity defined by first and second metal molds mounted for movement into and out of contact with each other, as a pre-form is supported and secured in the cavity, wherein the apparatus includes a core made up by a plurality of annularly arranged split core elements movable along a radial direction. On inner surfaces of the core elements, there are formed supporting parts, in such a manner that, in an opened state of the core when the plural core elements have been moved radially outwards, at least one pre-form can be introduced into a space defined by the core elements, and also in such a manner that, in the closed state of the core when the core elements have been moved to a preset location in a radially inner direction, the supporting parts are able to hold an outer peripheral part of the at least one pre-form.

According to the Sixth Aspect, plural core elements are moved or aggregated in a radially inner direction, as the pre-form is held radially inwardly of the core elements, whereby the outer peripheral part of the pre-form can be supported by the respective supporting parts of the set of the core elements. Since the pre-form does not have to be fitted and secured to the core or the metal mold, the working efficiency is improved. Moreover, according to the present invention, since the pre-form can be supported by exerting a smaller force to the outer peripheral part of the pre-form, it is possible to prevent fracture of the pre-form from occurrence.

According to a Seventh Aspect of the present invention, there is provided an apparatus for manufacturing a disk rotor of the Sixth Aspect wherein the supporting parts include first and second lugs (protrusions) extending radially inwardly for holding both lateral surfaces of the pre-form of a disk shape.

According to the Seventh Aspect, the pre-form can be supported with a smaller force by the first and second lugs formed on the core. Additionally, since the first and second lugs are protruded radially of the core, it is possible to prevent fluttering of the pre-form in a direction perpendicular to the radial direction of the core.

Referring to the drawings, an embodiment of the present invention, directed to a method and apparatus for manufacturing an aluminum MMC(Metal Matrix Composite) disk rotor, is now explained in detail.

First, the aluminum MMC disk rotor, manufactured in accordance with the present embodiment, referred to below as a disk rotor, is hereinafter explained.

Figure 2:
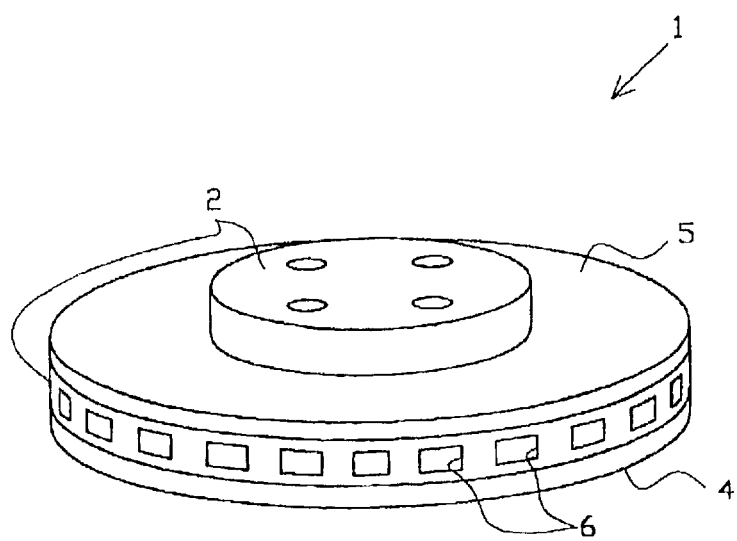
FIG. 2 is a perspective view showing the disk rotor.

Referring to FIG. 2, a disk rotor 1 in its entirety is substantially disk-shaped and is made up by a main body portion 2 and pre-form portions 4, 5. The main body portion 2, formed of aluminum or an aluminum alloy, is made up by a substantially columnar portion and a flange-shaped portion extending towards an outer periphery from a mid portion of the columnar portion. The flange-shaped portion of the main body portion 2 is formed with a plural number of fins 6 (which define spatial portions), at preset intervals, for opening in the peripheral direction.

The pre-form parts 4, 5 are provided in exposed states, so that, during use of the disk rotor 1, inner and outer pads of a vehicle, not shown, will be kept in sliding contact with these pre-form parts upon braking. The pre-form parts 4, 5 are produced from an inner pre-form 4A and an outer pre-form 5A (see FIG. 3) formed of alumina particles. More specifically, the pre-forms 4A and 5A, prior to aluminum impregnation, according to the present embodiment, may be obtained, e.g., by dispersing alumina particles in water, followed by filtering, under suction, by a suction filtration device, fitted with a filter, to produce a ring-shaped aggregate body (green shaped body) of alumina particles, and by subsequently drying and sintering the ring-shaped aggregate body. The initial volume ratio (Vf) of these pre-forms 4A, 5A is, e.g., on the order of approximately 30%. The pre-form parts 4, 5 in the present embodiment are formed by impregnating the aluminum or the aluminum alloy of the main body portion 2 into micro-sized pores of the pre-forms 4A, 5A. By the presence of these pre-form parts 4, 5, the disk rotor 1 may be improved in mechanical strength and wear resistance.

Figure 3:
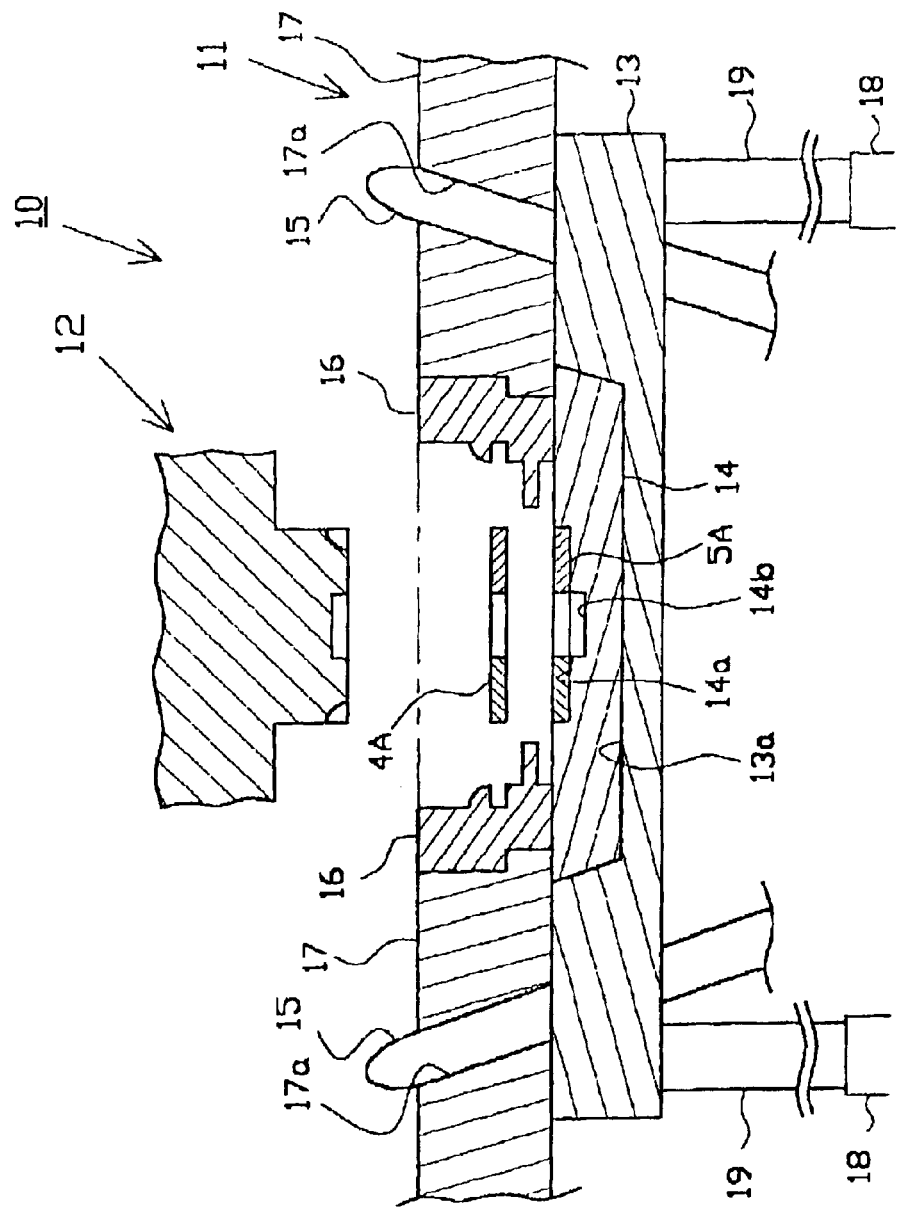
FIG. 3 is a cross-sectional view showing a device for manufacturing the disk rotor as the device is in a state of supporting pre-forms.

The structure of a disk rotor manufacturing device 10 for obtaining the disk rotor 1 is hereinafter explained. Referring to FIG. 3, the manufacturing device 10 includes a lower mold (die) 11, as a first metal mold, and an upper metal mold (die) 12, as a second metal mold, provided for movement into and out of contact with the lower mold 11.

The lower mold 11 includes a support block 13, a main body part of the lower mold 14, an inclined pin 15, a core element 16 and a slider 17. A cylinder 18 is provided below the support block 13. Within the cylinder 18 is telescopically (retractable/projectable) mounted a rod 19, the distal end of which is connected to a lower part of the support block 13. Within a recess 13a in the support block 13 is fixedly set the main body part of the lower mold 14. A molding recess (cavity) 14b having a step portion (shoulder) 14a at its outer peripheral portion is formed in an upper center portion of the main body part of the lower mold 14. The outer pre-form 5A is set on the step portion 14a.

On the upper surface of the main body part of the lower mold 14 are set a plural number of, herein 36, core elements 16 annularly and radially. Externally (outer sides) of the core elements 16 is secured a slider 17, such that the core elements 16 and the slider 17 are allowed to be slid in unison on the upper surface of the main body part of the lower mold 14. Meanwhile, in the present embodiment, the core elements 16 and the slider 17 make up support means.

The core is made up by a plural number of split core elements 16, which are arranged annularly and which are movable along the radial direction. On the inner peripheral side of the core elements 16, there are formed support portions that, in the opened state of the core in which the plural core elements 16 have been moved radially outwardly, permit at least one of the pre-forms, specifically the inner pre-form 4A as later explained, to be introduced into a space defined by the plural core elements 16; and that, in the closed state of the core in which the plural core elements 16 have been moved radially inwardly to a preset site, are able to hold an outer marginal portion of at least the one pre-form described above. These support portions are comprised of a first lug 22 and a second lug 23 capable of holding both lateral sides of the disk-shaped pre-form 4A, as will be explained subsequently.

In association with the core elements 16, a plural number of, herein 36, inclined pins 15, as inclined guides, are provided respectively for the core elements 16, and are each immovably secured, in an outwardly inclined state, by a fastener member, not shown. In the slider 17 are formed insertion through-holes 17a for the inclined pins 15, which are inserted into these through-holes 17a. In the support block 13, elongated through-holes of a slightly larger size are bored in slidable association with the inclined pins 15, in a manner not shown, whereby vertical movement of the support block 13 is not obstructed by the inclined pins 15.

In the above-described structure, when the cylinder 18 is actuated to cause vertical movement of the rod 19, the support block 13 and the main body part of the lower mold 14 are moved in the up-and-down direction, as shown in FIG. 3. At this time, the slider 17 is moved in the up-and-down direction along the inclined pins 15 which are in the fixed state. That is, the slider 17 and the core (core elements 16) are slid outwards, relative to the support block 13 and the main body part of the lower mold 14, as a result of the upward movement of the support block 13 and the main body part of the lower mold 14. When the rod 19 performs a receding movement, the support block 13 and the main body part of the lower mold 14 are moved downwards, as shown in FIG. 1, with the slider 17 being moved downwards along the inclined pins 15. That is, the slider 17 and the core (core elements 16) are slid inwards relative to the support block 13 and the main body part of the lower mold 14, as a result of the downward movement of the support block 13 and the main body part of the lower mold 14.

Figure 4:
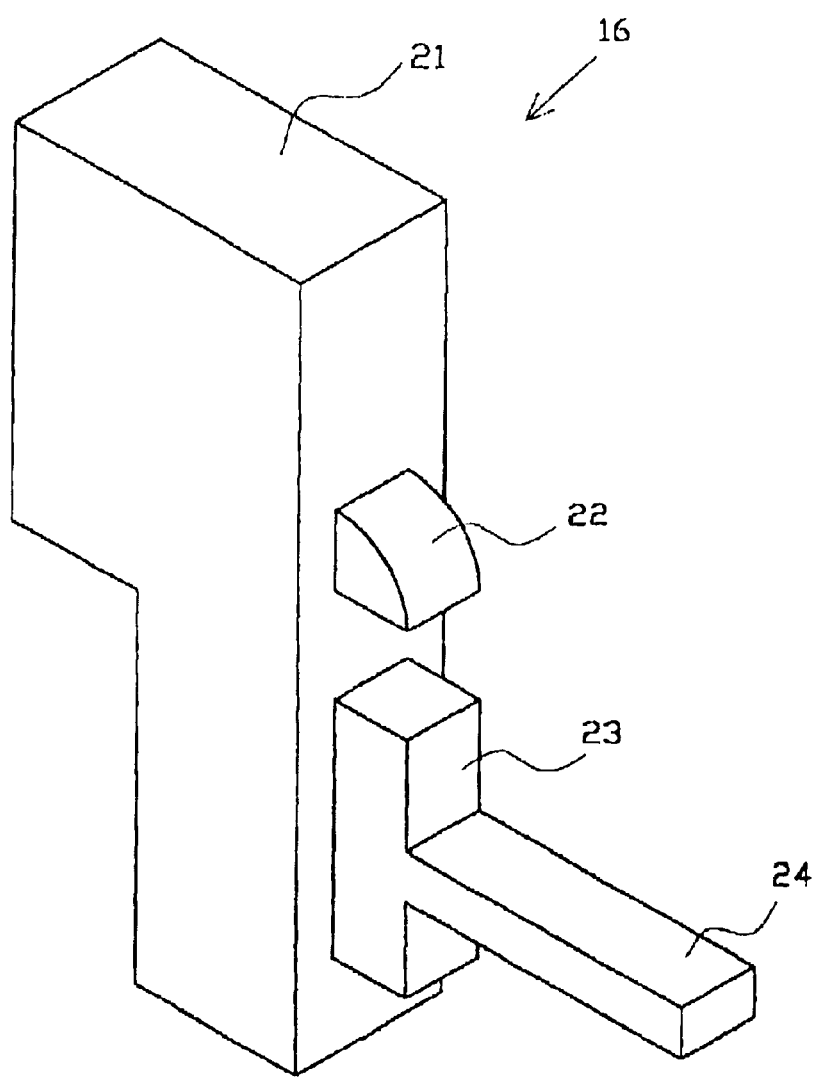
FIG. 4 is an enlarged perspective view showing a core element.
Figure 5:
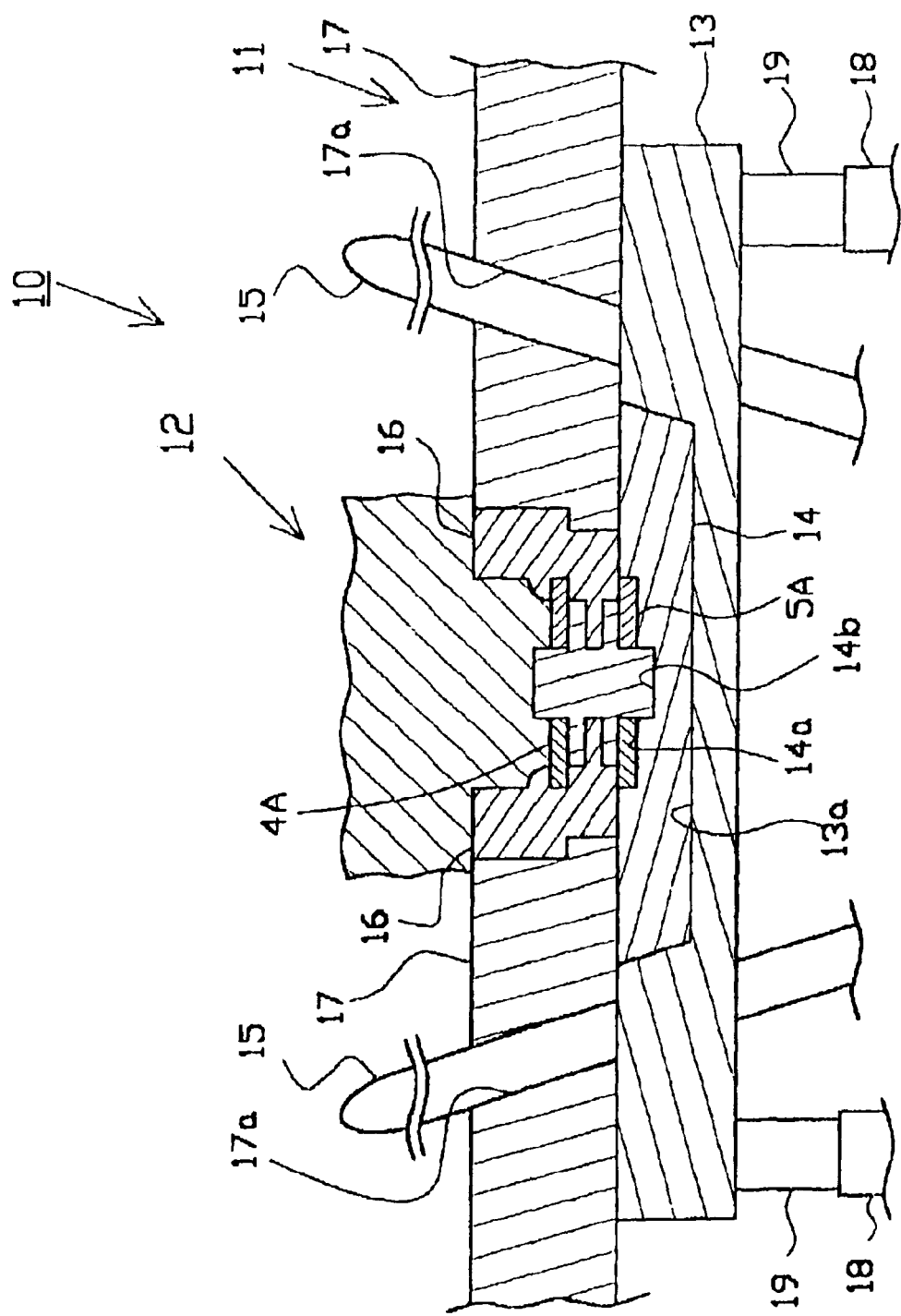
FIG. 5 is a cross-sectional view showing the disk rotor manufacturing device as the molten metal has been charged into the cavity.

The structure of the core elements 16 is now explained in more detail. FIG. 4 shows, in an enlarged perspective view, one core element 16 used in the present embodiment. As shown therein, the core element 16 is made up by a block-shaped main body part 21, a first lug (projection) 22 mounted upright on the inner lateral surface of the main body part 21 and a second lug 23 mounted upright on the inner surface of the main body part 21 at a preset distance from and below the first lug 22. This preset distance is set so as to be approximately equal to the thickness of the inner pre-form 4A. The second lug 23 is formed so as to form an inwardly extending fin-forming lug (projection) 24.

The method for manufacturing the disk rotor 1, using the above-described manufacturing device 10, is now explained. First, in the mold-opening state in which the upper mold 12 is separated from the lower mold 11, the temperature of the lower mold 11 and the upper mold 12 is raised to a preset value of, e.g., 200 to 500° C.

The pre-heated pre-forms 4A, 5A are then set at preset positions. That is, the cylinder 18 is actuated, as shown in FIG. 3, to cause upward movement of the rod 19 and hence the support block 13 and the main body part of the lower mold 14, as shown in FIG. 3. Since the slider 17 is then moved upwards together along the inclined pin 15, which is in the immobilized state, the slider 17 and the core (core elements 16) are moved outwards relative to the main body part of the lower mold 14.

In this state, the outer pre-form 5A is set on the step portion 14a of the lower mold 14, by an arm, not shown. The arm then is moved upwards so as to be separated away from the outer pre-form 5A. On the other hand, the inner pre-form 4A is held at a preset height, as shown, by an arm (placing arm), not shown. During the inner pre-form 4A is held at a preset height, the rod 19 is receded. This causes the support block 13 and the main body part of the lower mold 14 to be moved downwards, until reaching the state as shown in FIG. 1, with the slider 17 being moved downwards along the inclined pins 15. As the main body part of the lower mold 14 is moved downwards, the slider 17 and the core (core element 16) are slid inwards, relative to the main body part of the lower mold 14.

By this sliding, a marginal area of the upper surface of the outer pre-form 5A is pushed down (or pressed) by the core elements 16, whereby the outer pre-form 5A is supported and secured in the state as shown in FIG. 1. Simultaneously, the outer marginal portion of the inner pre-form 4A is sandwiched between the lower surface of the first lug 22 of the core element 16 and by the upper surface of the second lug 23, whereby the inner pre-form 4A is supported and secured at a present axial vertical position (height). When the inner pre-form 4A is supported and secured in this manner, the placing arm holding it is moved upwards away from the inner pre-form 4A.

After supporting and securing the pre-forms 4A and 5A, molten metal, herein molten aluminum or aluminum alloy, is charged (poured) into a cavity from a molten metal forcing mechanism, not shown. The upper mold 12 is moved downwards, after charging (pouring) the molten metal into the cavity, into abutment against the lower mold 11, by way of pre-forming mold clamping. By this mold clamping of the upper mold 12, the inner space of the cavity is pressurized.

After continuing the pressurization until the molten metal is hardened, the upper mold 12 is separated away from the lower mold 11, by way of pre-forming mold opening. The cylinder 18 is again actuated to cause upward movement of the support block 13 and the main body part of the lower mold 14 to cause the core elements 16 to be slid outwards to produce the disk rotor 1 shown in FIG. 2.

In the present embodiment, as described above, the lower mold 11 is made up by the support block 13, main body part of the lower mold 14, inclined pins 15, core elements 16 and the slider 17. The cylinder 18 then is actuated to cause upward movement of the support block 13 and the main body part of the lower mold 14 and, during this upward movement, the core elements 16 and the slider 17 are slid relatively outwards along the inclined pins 15. Thus, in this state, the inner pre-form 4A and the outer pre-form 5A may be guided (and placed) to preset sites without being obstructed by e.g., the core elements 16. After guiding (placing) the pre-forms 4A, 5A to the present sites in this manner, the support block 13 and the main body part of the lower mold 14 are lowered. During this downward travel, the core elements 16 and the slider 17 are slid relatively inwards along the inclined pins 15. As a result, the pre-forms 4A, 5A are supported and secured in a stable state, while the main portion of the cavity may also be formed simultaneously.

Moreover, in distinction from the conventional technique, in which it has been necessary to compress the pre-forms or to apply coating, the pre-forms 4A, 5A can be supported and secured in the stable state at a preset site, simply on performing driving control of the cylinder 18, without necessity of machining the pre-forms 4A, 5A in some form or another. The result is that there is no inconvenience such as worsened operating efficiency or increased production cost.

The present invention is not limited to the above-described embodiment and may be modified, for example, in the following manner.

(a) The shape of the core elements 16 is not limited to that shown in the above-described embodiment, provided that the core elements 16 are able to support and secure at least one pre-form. The first lug 22 or the second lug 23 of the core element 16 may be dismountable (or exchangeable) so that the lugs can be exchanged depending on the size or the shape of the pre-forms 4A, 5A or the disk rotor 1.

(b) In the above-described embodiment, the pre-forms 4A, 5A are provided on the inner and outer sides, respectively. However, only one pre-form would suffice, in which case only the inner side or the outer side is provided with the pre-form.

(c) In the above-described embodiment, the disk rotor 1 has the fins 6 at preset intervals. Alternatively, the present invention may also be applied to a disk rotor of the type not provided with the fins 6, in which case the fin-forming lug 24 for forming the core is omitted.

(d) In the above-described embodiment, the angle of inclination of the inclined pins 15 is constant. Alternatively, the angle of inclination may be changed depending on particular requirements. Still alternatively, the inclined pins 15 may be exchanged or the number thereof may be increased or decreased depending on the size or the shape of the pre-forms 4A, 5A or the disk rotor 1.

(e) In the above-described embodiment, the straight-shaped inclined pins 15 are used as inclined guides. These need not be linear but curved. Moreover, the inclined guides may also be formed by other members, such as wires or resilient rod members.

(f) In the above-described embodiment, the support block 13 and the main body part of the lower mold 14 are designed as separate members. Alternatively, these members may be formed as one with one another, while the core elements 16 and the slider 17 may also be formed as one with one another.

(g) As means for vertical movement of e.g., the support block 13, it is possible to use an actuator other than the cylinder 18, shown as an example in the above embodiment, such as a screw rod driven by a motor.

(h) The numbers of the core elements 16, slider 17 or the inclined pins 15 are not limited to those shown in the above-described embodiment and may be any suitable plural numbers.

(i) The material of the molten metal may be any suitable composite materials comprised of aluminum or aluminum alloys, mixed with an additional ingredient such as silicon carbide, in addition to aluminum or aluminum alloys.

(j) The pre-forms 4A, 5A are not limited to those prepared by the manufacturing method explained in the above-described embodiment. For example, the pre-forms may be produced by solidifying alumina through any suitable manner, e.g., pressurization or sintering. The pre-forms may also be formed of other materials, such as ceramic fibers, capable of improving the mechanical strength or wear resistance, or may alternatively be formed by ceramic particles, such as particles of silicon carbide or alumina or a mixture thereof, in place of the alumina particles. The volume ratio of the pre-forms is not to be limited by the particular value shown in the embodiment such that pre-forms with variable volume ratio values may be used depending on the desired ultimate properties.

The meritorious effect of the present invention are summarized as follows.

With the methods and apparatus for manufacturing the disk rotor according to the present invention, described above in detail, the pre-form supporting state may be improved in stability in the manufacture of the disk rotor employing pre-forms, while it is possible to prevent the working efficiency from being lowered, as well as to suppress the cost, in a manner unprecedented in the prior-art method or apparatus.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed:

1. An apparatus for manufacturing a disk rotor, comprising:

means for charging and pressurizing molten metal in a cavity that is defined at least in part by first and second metal molds that are disposed for movement into and out of contact with each other;

wherein at least one of said first and second metal molds further includes supporting means having a supporting part for supporting a marginal portion of a pre-form;

wherein said supporting means is adapted to assume a first state in which the pre-form may be guided to a preset site and is further adapted to assume a second state in which said supporting means forms at least a portion of said cavity; and wherein said supporting part is adapted to support the marginal portion of the pre-form when said supporting means assumes said second state, said supporting means being made up of at least one core element.

2. An apparatus for manufacturing a disk rotor by charging and pressurizing molten metal in a cavity defined by first and second metal molds disposed for movement into and out of contact with each other when a pre-form is supported and secured in said cavity, wherein at least one of said first and second metal molds comprises a main body mold part which is movable between at least a first position and a second position, and further comprises supporting means for supporting a marginal portion of the pre-form and for sliding in a direction of intersecting the direction of movement of said main body part of the mold;

wherein the pre-form can be guided to a preset site when the main body part of the mold is in said first position; and wherein said supporting means forms at least a portion of said cavity and supports the marginal portion of the pre-form when the main body mold part is at said second position, said supporting means being made up of at least one core element.

3. The apparatus for manufacturing a disk rotor as defined in any of claim 1 or 2 wherein said supporting means is adapted for supporting the marginal portions or two pre-forms which are in a state of being separated from each other.

4. An apparatus for manufacturing a disk rotor, comprising:

first and second metal molds that are disposed for movement into and out of contact with each other and that define at least a portion of a cavity that is adapted to receive molten metal; and a support structure forming a portion of one of said first and second molds, said support structure being adapted to assume a first state in which a pre-form may be guided to a preset site with respect to said one of said first and second molds, said support structure being further adapted to assume a second state in which at least a portion of said support structure forms at least a portion of said cavity and in which a marginal portion of the pre-form is supported on a supporting part of said support structure, said support structure being made up of at least one core element.

* * * * *